(12) United States Patent
Jersin et al.

(10) Patent No.: US 10,185,738 B1
(45) Date of Patent: Jan. 22, 2019

(54) DEDUPLICATION AND DISAMBIGUATION

(71) Applicant: Microsoft Technology Licensing, LLC, Redmond, WA (US)

(72) Inventors: John Robert Jersin, San Francisco, CA (US); Benjamin John McCann, Mountain View, CA (US); Erik Eugene Buchanan, Mountain View, CA (US); Kevin Keck, San Jose, CA (US); Jeffrey Michael Wright, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/253,588

(22) Filed: Aug. 31, 2016

(51) Int. Cl.
*G06F 17/30* (2006.01)
*G06N 7/00* (2006.01)

(52) U.S. Cl.
CPC ....... *G06F 17/30371* (2013.01); *G06N 7/005* (2013.01)

(58) Field of Classification Search
CPC ......... H04L 51/16; H04L 51/36; H04L 51/32; G06Q 10/1053; G06Q 50/01; G06F 17/30303; G06F 17/30371; G06N 7/005
See application file for complete search history.

(56) References Cited

U.S. PATENT DOCUMENTS

| | | | |
|---|---|---|---|
| 6,026,417 A | 2/2000 | Ross et al. | |
| 6,349,299 B1 | 2/2002 | Spencer et al. | |
| 7,912,842 B1 | 3/2011 | Bayliss | |
| 8,370,349 B2 * | 2/2013 | Quoc | G06Q 10/10 707/710 |
| 8,825,785 B1 | 9/2014 | Shah et al. | |
| 2004/0133855 A1 | 7/2004 | Blair et al. | |
| 2005/0132002 A1 | 6/2005 | Creamer et al. | |
| 2008/0109294 A1 * | 5/2008 | Williams | G06Q 30/02 705/7.29 |
| 2008/0140684 A1 | 6/2008 | O'reilly et al. | |
| 2009/0239467 A1 | 9/2009 | Gulin et al. | |
| 2010/0070499 A1 | 3/2010 | Gottsman | |

(Continued)

OTHER PUBLICATIONS

"U.S. Appl. No. 15/410,525, Non Final Office Action dated May 3, 2018", 23 pgs.

(Continued)

*Primary Examiner* — Jorge A Casanova
(74) *Attorney, Agent, or Firm* — Schwegman Lundberg & Woessner, P.A.

(57) ABSTRACT

Systems and methods for deduplication and disambiguation are disclosed. In example embodiments, a server accesses stored information about a first entity and stored information about a second entity. The server determines, based on the accessed stored information about the first entity and the accessed stored information about the second entity, a set of information items known about both the first entity and the second entity. The server computes, based on the set of information items, a probability that the first entity corresponds to the second entity by computing one or more expressiveness scores corresponding to a value of a first information item and a value of a second information item from the set of information items. The server provides, as a digital transmission, an output representing the computed probability.

17 Claims, 4 Drawing Sheets

(56) References Cited

U.S. PATENT DOCUMENTS

| | | | |
|---|---|---|---|
| 2010/0161566 | A1 | 6/2010 | Adair et al. |
| 2012/0290950 | A1 | 11/2012 | Rapaport et al. |
| 2013/0054598 | A1 | 2/2013 | Caceres |
| 2013/0166489 | A1 | 6/2013 | Jagota |
| 2013/0212185 | A1 | 8/2013 | Pasquero et al. |
| 2013/0254213 | A1 | 9/2013 | Cheng et al. |
| 2013/0290208 | A1 | 10/2013 | Bonmassar et al. |
| 2014/0330734 | A1 | 11/2014 | Sung et al. |
| 2014/0331124 | A1 | 11/2014 | Downs et al. |
| 2015/0081578 | A1 | 3/2015 | Mclaughlin et al. |
| 2015/0113605 | A1 | 4/2015 | Henderson et al. |
| 2015/0205842 | A1* | 7/2015 | Jain .................. G06F 17/30289 707/732 |
| 2015/0248651 | A1 | 9/2015 | Akutagawa et al. |
| 2015/0304437 | A1 | 10/2015 | Vaccari et al. |
| 2015/0347534 | A1 | 12/2015 | Gross et al. |
| 2016/0055235 | A1 | 2/2016 | Zhang et al. |
| 2016/0132832 | A1 | 5/2016 | Pinkovezky et al. |

OTHER PUBLICATIONS

"U.S. Appl. No. 15/274,418, Non Final Office Action dated Apr. 19, 2018", 31 pgs.

"U.S. Appl. No. 15/410,525, Examiner Interview Summary dated Jun. 11, 2018", 3 pgs.

"U.S. Appl. No. 15/410,525, Response filed Aug. 1, 2018 to Non Final Office Action dated May 3, 2018", 15 pgs.

* cited by examiner

DEDUPLICATION AND DISAMBIGUATION

RELATED APPLICATIONS

This application is related to U.S. patent application Ser. No. 15/341,711, titled "IDENTIFYING USER INFORMATION FROM A SET OF PAGES," and filed on Nov. 2, 2016, which is incorporated herein by reference in its entirety. This application is related to U.S. patent application Ser. No. 15/274,418, titled "MESSAGING SERVICE INTEGRATION WITH DEDUPLICATOR," and filed on Sep. 23, 2016, which is incorporated herein by reference in its entirety. This application is related to U.S. patent application Ser. No. 15/274,464, titled "APPLICANT TRACKING SYSTEM INTEGRATION WITH DEDUPLICATOR," and filed on Sep. 23, 2016, which is incorporated herein by reference in its entirety.

TECHNICAL FIELD

The present disclosure generally relates to machines configured for deduplication and disambiguation of data stored in a data repository, including computerized variants of such special-purpose machines and improvements to such variants, and to the technologies by which such special-purpose machines become improved compared to other special-purpose machines that provide deduplication technology. In particular, the present disclosure addresses systems and methods for deduplication and disambiguation of data stored in a data repository.

BACKGROUND

Deduplication and disambiguation of data stored in a data repository may be useful in multiple contexts. In one example, a person may combine multiple contact lists (e.g., an email contact list, a social network contact list, and a mobile phone contact list) and wish to remove duplicate entries. In another example, a team of recruiters may be prohibited (e.g., for legal, company policy or best practice reasons) from contacting candidates that the team has previously contacted during a time period (e.g., in the last six months). Thus, when reviewing a potential candidate, the recruiter may wish to compare the candidate with previously contacted candidates. As the foregoing illustrates, techniques for deduplication and disambiguation of data stored in a data repository may be desirable.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
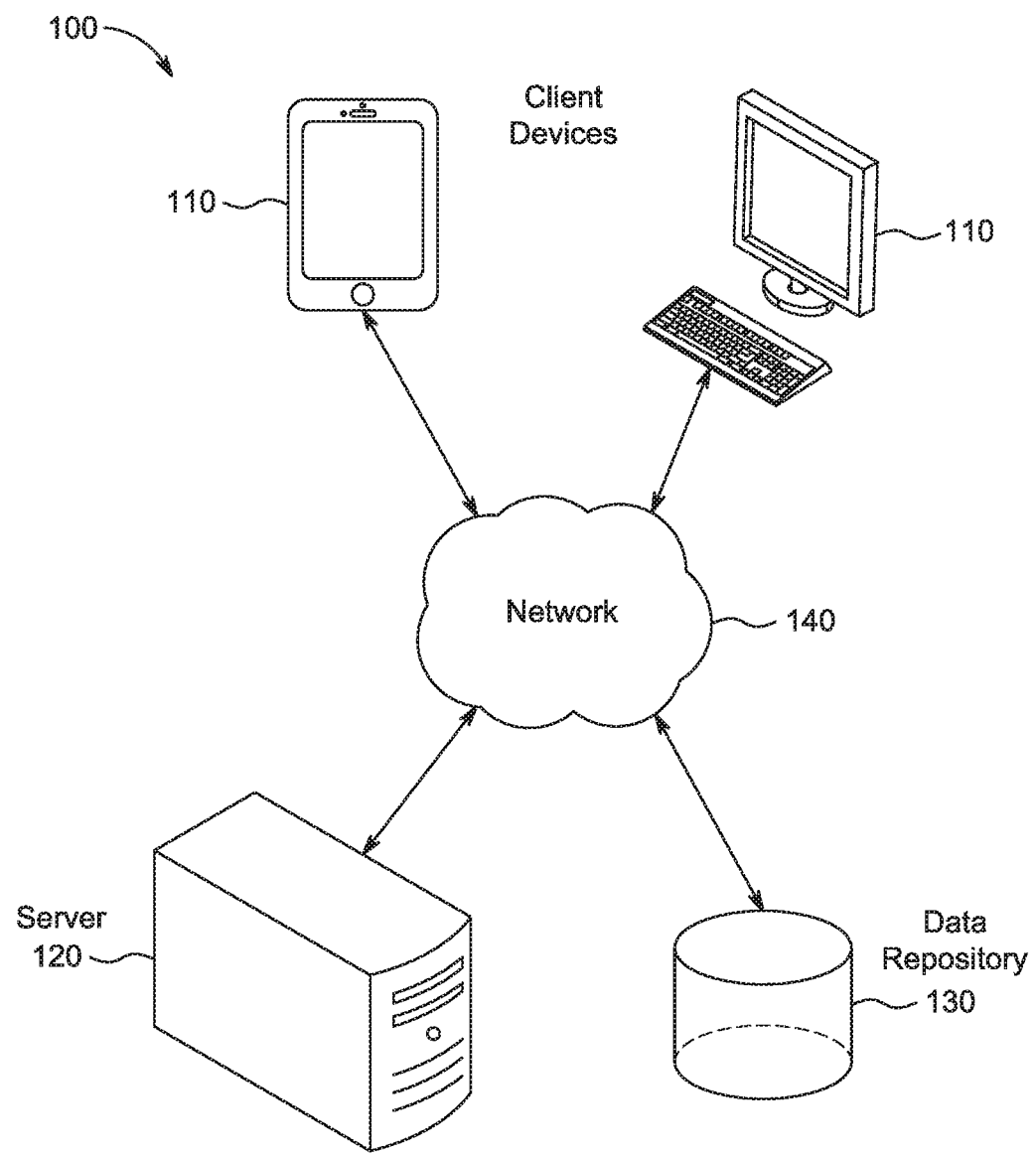
FIG. 1 illustrates an example network system, in accordance with some embodiments.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Some aspects of the subject technology address the problem in the computer arts of deduplication and disambiguation. According to some implementations, the solution to the problem of deduplication and disambiguation includes a server accessing, in a data repository, stored information about a first entity and stored information about a second entity. The data repository may be a database or may have any other structure. In some examples, the stored information includes one or more of a first name, a last name, a telephone number, an email address, a postal address, a social networking link or handle, and the like. The server determines, based on the accessed stored information about the first entity and the accessed stored information about the second entity, a set of information items known about both the first entity and the second entity. The server computes, based on the set of information items, a probability or a score that the first entity corresponds to the second entity by computing one or more expressiveness scores corresponding to a value of a first information item and a value of a second information item from the set of information items. The server provides, as a digital transmission (e.g., to another machine or to a different component of the server), an output representing the computed probability or score. In some cases, if the computed probability or score exceeds a threshold probability (e.g., 80% or 95%) or threshold score, the server determines that the first entity and the second entity represent a common individual or organization based on the computed probability or score exceeding the threshold probability or score. The server combines, within the data repository, the first entity and the second entity into a single entity in response to determining that the first entity and the second entity represent a common individual or organization. As used herein, a data repository may include any data storage unit, for example, Random-Access Memory (RAM), a database, cloud storage, and the like. In some cases, the two entities being de-duplicated might reside in different data storage units. According to one mode of operation, one piece of information is inserted in the data repository (but does not yet reside in the data repository) and is de-duplicated against numerous potential matches already in the data repository. However, any amount of the information ranging from none to all of it may live in the data repository.

As used herein, the term "deduplication" may refer to, among other things, removing duplicate entries from a data repository. For example, if a data repository includes the following entities: (1) "John Sample," mobile phone 650-555-1212, and (2) "John Q. Sample," mobile phone 650-555-1212, a server may conclude that these entries are duplicates (due to similar name and same mobile phone number) and remove one of the duplicate entries or combine the entries.

As used herein, the term "disambiguation" may refer to, among other things, replacing ambiguous entries with full entries. For example, if a data repository includes the entities: (1) "John Sample," mobile phone 650-555-1212, and (2) "J. Sample," mobile phone 650-555-1212, a server may conclude, based on the common last name and mobile phone numbers, that the initial J represents John and replace "J" with "John."

FIG. 1 illustrates an example network system 100, in accordance with some embodiments. As shown, the system 100 includes client devices 110, a server 120, and a data repository 130 connected to one another and capable of communicating with one another via a network 140. The network 140 may include one or more networks and may include one or more of the Internet, a wide area network (WAN), a local area network (LAN), a virtual private network (VPN), an intranet, and the like.

The subject technology may be implemented with multiple client devices 110. Each client device 110 may be a laptop computer, a desktop computer, a mobile phone, a tablet computer, a smart watch, a personal digital assistant (PDA), a digital music player, and the like. The client devices 110 may be used to add data to the data repository 130 and to access data stored in the data repository 130.

The data repository 130 may be implemented as a database or any other data storage unit. The data repository 130 stores a set of entities and information about each entity. The entity may represent a contact, such as an individual or an organization. The data repository 130 is described in more detail in conjunction with FIG. 2, below.

The server 120 is configured to apply deduplication and disambiguation to the data repository, for example, as set forth above. More details of the operation of the server 120 are provided in conjunction with FIG. 3, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
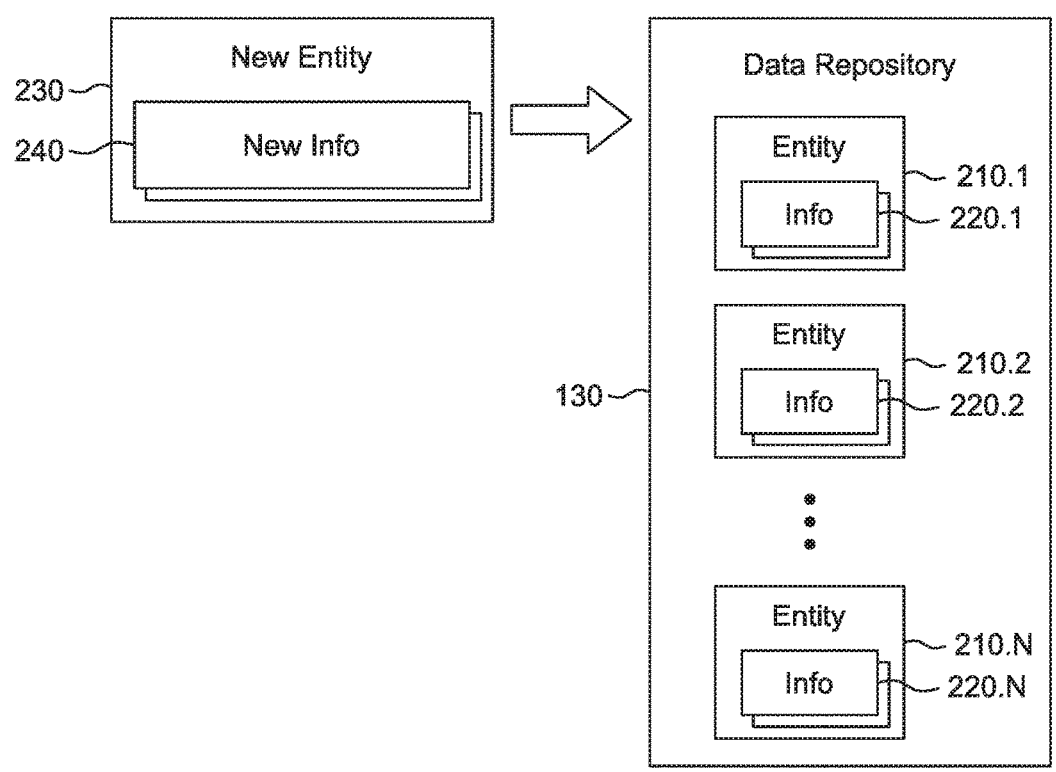
FIG. 2 is a block diagram illustrating an example of the data repository of FIG. 1, in accordance with some embodiments.

FIG. 2 is a block diagram illustrating an example of the data repository 130 of FIG. 1, in accordance with some embodiments. As shown, the data repository 130 stores information 220.1-N about multiple entities 210.1-N. Each entity 210.k (where k is a number between 1 and N) may be an individual or an organization. The information 220.k about the entity 210.k may include one or more of a first name, a last name, a telephone number, an email address, a postal address, a social networking link or handle, and the like. Other attributes in the information items 220.k may include employer(s), educational institution(s), and the like. The list of attributes provided here is not exhaustive. In some cases, one or more of the information items in the information 220.k may be missing (e.g., a name and a telephone number, but no email address, may be stored). The data repository 130 may correspond to a contact list of a user of an email service, a mobile phone, or an online contact storage service. Multiple information items 220.k may be stored for each entity 210.k.

In some cases, a new entity 230 (similar to entity 210) having new information 240 (similar to information 220) may be added to the data repository 130. For example, the data repository may store an online contact list, and a user of a client device 110 may decide to add a new entity 230 to his/her contact list, and to provide some new information 240 for the new entity.

In these cases, the server 120 may determine, using the techniques described herein, whether the new entity 230 represents a new individual or organization or an individual or organization that is already associated with one of the entities 210.1-N. In the latter case, the new entity may be combined with the one of the entities 210.1-N representing the same individual or organization.

Figure 3:
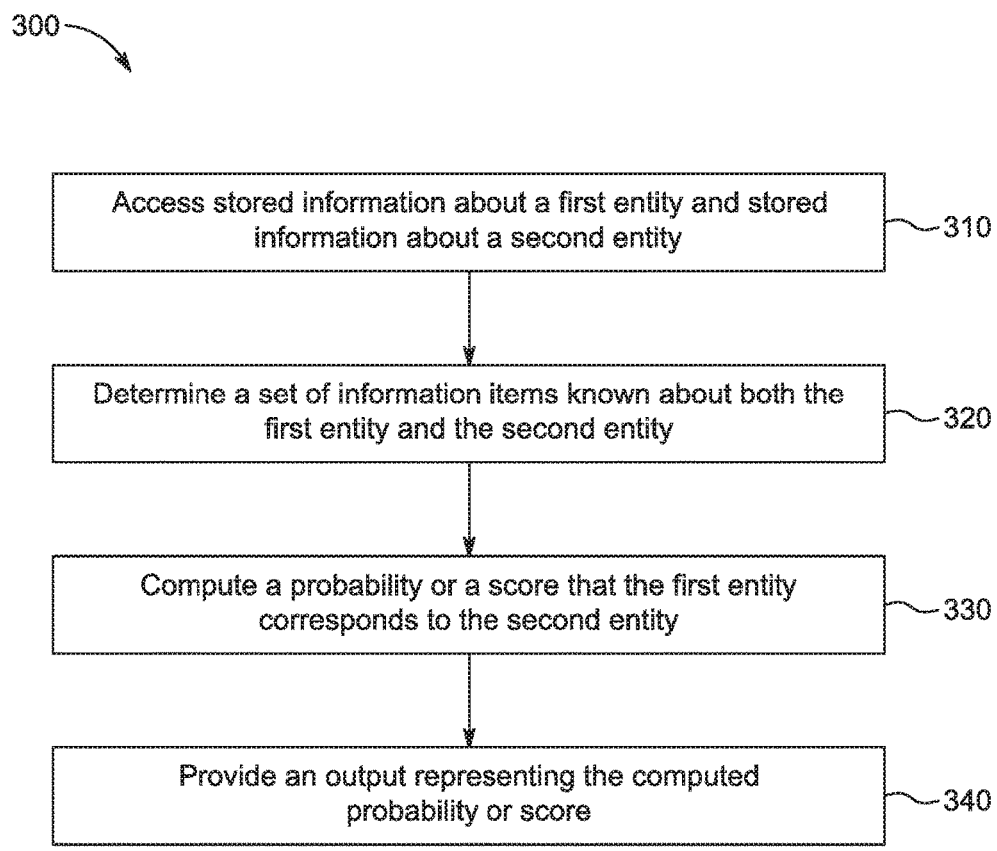
FIG. 3 is a flow chart illustrating an example method for identifying duplicate data.

FIG. 3 is a flow chart illustrating an example method 300 for identifying duplicate data. After duplicate data is identified, the duplicate data may be combined into a single data entry. In some examples, the method 300 is implemented at the server 120. It should be noted that, if entities are combined, the server 120 (or another machine) retains a copy of the original record so that the decision to combine these entities may be revisited in the future as more information is acquired or as improvements/modification are made to the disambiguation techniques used. Combined entities and original source entities may be stored separately.

At operation 310, the server 120 accesses stored information about a first entity and stored information about a second entity. The stored information about the first entity and the second entity may be stored in the data repository 130. In some cases, the first entity is the new entity 230 being added to the data repository 130, and the second entity is one of the entities 210.k (where k is a number between 1 and N) in the data repository 130. In some cases, the first entity is an entity 210.m (where m is a number between 1 and N) in the data repository, and the second entity is another one of the entities 210.k in the data repository.

At operation 320, the server 120 determines, based on the accessed stored information about the first entity and the accessed stored information about the second entity, a set of information items known about both the first entity and the second entity. The information items may include (but is not limited to) one or more of a first name, a last name, a telephone number, an email address, a postal address, a social networking link or handle, and the like. The information about the first entity may be stored in information 240 (if the first entity is the new entity 230) or the information 220.m (if the first entity is the entity 210.m). The information about the second entity may be stored in information 220.k (if the second entity is the entity 210.k). In some cases, each information item has an information type. The information type may be (but is not limited to) one of a name type (e.g., first name, last name, and the like), a contact type (e.g., email address, telephone number, instant messenger screen name, social network handle, and the like), a business type (e.g., company name, industry, and the like), a geography type (e.g., street address, city, state, country, and the like), and the like.

In one example, the information items known about the first entity include a first name, an email address, and a telephone number. The information items known about the second entity include a first name, a last name, an email address, and a social networking link. In this example, the information items known about both the first entity and the second entity include the first name and the email address. In some cases, information item(s) may be converted into a normalized format using data normalization. For example, names, email addresses, and the like may be converted into a normalized format that recognizes, for example that "John@Example.com" and "john@example.com" represent the same email address and "617-555-1234" and "+1 617 555 1234" represent the same telephone number. Data normalization may also include looking up in a database (or other data structure) that common names are associated with the same entity, for example "Ben" is a nickname for "Benjamin," and "IBM" and "International Business Machines" are the same. Furthermore, the database may also include historical information, such as the fact that Target-Company was acquired by Buyer-Company in June 2014 (and, therefore, a first entity that is named John Smith and worked for Buyer-Company in August 2014, and a second entity that is named John Smith and worked for Target-Company in July 2014, are likely the same).

At operation 330, the server 120 computes, based on the set of information items known about both the first entity and the second entity, a probability or a score that the first entity corresponds to the second entity (i.e., that the first entity and the second entity represent the same person or organization). The probability is computed by combining a set of computed expressiveness scores. An expressiveness score is computed from a value of a first information item and a value of a second information item (and, in some cases, values of other information items) from the set of information items. The expressiveness score indicates a confidence in whether the information items match or are in conflict with each other and the uniqueness of such a match in the case where the items match. The first information item may have a different information type from the second information item. For example, the first information item may be a first and last name, and the second information item may be an email address.

In some cases, one of the expressiveness scores corresponding to the value of the first information item and the value of the second information item represents a probability that the first entity corresponds to the second entity given that the first information item and the second information item are associated with both the first entity and the second entity. For example, in a given population (e.g., the population of the San Francisco Bay Area), the last name "Patel" may be fairly common and the first name "Isaac" may be fairly common. However, the full name "Isaac Patel" may be fairly uncommon (e.g., because one group of people is associated with the name "Isaac" and another group of people is associated with the name "Patel"). Thus, in this population "Isaac Patel" may have a high expressiveness score. In another example, the first name "Isaac" may be common and the last name "Cohen," may be common. However, the full name "Isaac Cohen" may have a lower expressiveness score because "Isaac" and "Cohen" are associated with the same sub-group of the population.

In other words, in a population, 1% of people may have the first name "Isaac," 1% of people may have the last name "Cohen," and 1% of people may have the last name "Patel." However out of the people named "Isaac," 5% may have the last name "Cohen" (multiplied to 0.05% of the whole population), while only 0.1% may have the last name "Patel" (multiplied to 0.001% of the whole population). Thus, people named "Isaac Patel" are rarer than people named "Isaac Cohen," resulting in a higher expressiveness score for "Isaac Patel," than for "Isaac Cohen."

In some examples, one of the expressiveness scores measures a codependence between the first information item and the second information item. For example, last names and email addresses may be highly codependent (e.g., someone with the last name Smith is likely to have the email address *smith@email-provider.com). Thus, a last name combined with an email address might not be very expressive. On the other hand, a social network handle that corresponds to a "pen name" or unusual nickname (e.g., "silver-bear" or "crazy-climber") combined with the last name Smith might have a higher expressiveness score, as such pen names/nicknames are not related to the last name.

In yet another example, one of the expressiveness scores may measure or be computed based on a frequency of occurrence of the first information item within the population or a frequency of occurrence of the second information item within the population. In one case, the expressiveness score is computed as the product of the frequency of occurrence of the first information item, the frequency of occurrence of the second information item, and a damping factor (e.g., 1.1). The damping factor may be used to account for the fact that the first information item may be positively correlated with the second information item. In this embodiment, correlation between the first information item and the second information item is not otherwise taken into account.

In some cases, one of the expressiveness scores is inversely proportional to a population size. For example, an employee being associated with "ABC Pizza Shop," which has approximately 10 employees, is more expressive than an employee being associated with "XYZ Multinational Software Company," which has approximately 10,000 employees. It is more likely that two records that have the first name "Cindy," and the employer "ABC Pizza Shop," are the same, than that two records which have the first name "Cindy," and the employer "XYZ Multinational Software Company," are the same, as it is more likely that two of 10,000 people have the same first name, than that two out of 10 people have the same first name. In some cases, names or combinations of names that are rarer have a higher expressiveness score. For example, the first name "Brogan" is rarer than the first name "John," and thus corresponds to a higher expressiveness score. Covariant expressiveness is also taken into account. For example, the name "Xiaolu Patel" may have a very high expressiveness score as the first name "Xiaolu" is an East Asian name, whereas the last name "Patel" is an Indian name, and it is very unusual for a person to have a first and last name associated with such different geographies. Databases of statistics are used in calculating expressiveness scores. Such databases may be acquired from commercial sources, governmental censuses, computed via entities in a data repository, and the like. An example record from such a database might look like {id:4, stdCompanyName:"XYZ, Corporation", numEmployees:10000} or {name:"McCann", count:676244, raceCounts:[white_non_hispanic:664324, hispanic:3212, black:8342, asian:321, american_indian:45]}.

At operation 340, the server 120 provides, as a digital transmission, an output representing the computed probability or score that the first entity corresponds to the second entity. In some cases, the server 120 determines that the computed probability or score exceeds a threshold probability (e.g., 80% or 95%) or a threshold score. The server 120 determines that the first entity and the second entity represent a common individual or organization based on the computed probability or score exceeding the threshold probability or score. In some implementations, the server combines the first entity and the second entity into a single entity in response to determining that the first entity and the second entity represent the common individual or organization. In this manner, duplicate entities from the entities 210.1-N of the data repository 130 may be combined into single entities.

In some cases, there may be multiple entities to deduplicate. For example, Entity A may include the name "Bill Clinton." Entity B may include the telephone number "212-555-1234." Entity C may include both "Bill Clinton" and "212-555-1234." The server 120 may conclude that Entity A and Entity B are the same based on Entity A corresponding to Entity C and Entity B corresponding to Entity C. In some cases, the probability or the score that the first entity corresponds to the second entity is computed initially, and then updated based on changes/improvements to the algorithm or based on additional information being added to the first entity or the second entity. Based on the updated probability or score, the server 120 may conclude that a first entity and second entity which were previously the same are now different, or vice versa. In some implementations, a graph of pairwise probabilities/scores for first entities and second entities is stored. When a probability/score in the graph changes, due to changes in the algorithm or changes in stored information about the entities, the server 120 may modify its conclusion about whether a first entity and a second entity represent the same entity.

The subject technology may have multiple different use cases. For example, the subject technology may be implemented to remove duplicate contacts from a contact list of an email account, a mobile phone, a personal digital assistant (PDA), an online contact storage unit, and the like.

In one example, the subject technology is implemented in a recruiting context, where an office of multiple recruiters is prohibited (e.g., due to legal, company policy, or best practice reasons) from contacting the same candidate multiple times within a given time period (e.g., six months or twelve month). In the recruiting context, the first entity represents an employment candidate whom one of the multiple recruiters wishes to contact. The data repository 130 stores, as the entities 210.1-N, a list of employment candidates whom the multiple recruiters have contacted previously during the given time period. The second entity is one of the entities stored in the data repository 130. The output representing the computed probability is a notification to the recruiter that the multiple recruiters from the office have likely (e.g., with a likelihood represented by the probability) previously contacted the employment candidate whom the recruiter wishes to contact. In some cases, a notification that the employment candidate has already been contacted may be shown without the probability, for example, if the probability exceeds a threshold value (e.g., 99.6%). A notification that the employment candidate may have been contacted, along with the probability, may be shown if the probability is within a certain range (e.g., between 70% and 99.6%) or if there is reason to believe that stored information about the employment candidate is inconsistent or incorrect.

In summary, the first entity represents an individual (e.g., employment candidate) whom one or more users (e.g., recruiters from a recruiting team, or a specific recruiter on the recruiting team) wish to contact. The second entity represents an individual (e.g., an employment candidate from a data repository storing previously-contacted candidates of the recruiting team) that the one or more users have previously contacted. The output representing the computed probability includes a notification that he one or more users have likely previously contacted the individual represented by the first entity. Other entities, different from individuals, can also be de-duplicated. For example, businesses that appear on multiple different services (e.g., a professional networking service, a mapping service, an employment search service, and the like) may be de-duplicated in a system that stored links to information about businesses.

Embodiments are described herein as being performed in a network system (e.g., system 100 of FIG. 1) with different machines carrying out different functions. However, the subject technology is not limited to network system. In some cases, a single machine may perform the functions of both the server and the data repository. This machine may be either a client device or a server. The single machine may either have or lack network connectivity. In some cases, the network 140 of FIG. 1 may be replaced with a hard-wired or direct wireless connection between two or more machines.

In this manner, this disclosure provides approaches for deduplication and disambiguation of data (e.g., a contact list) stored in a data repository, such as a database. According to some implementations, a server accesses, in a data repository, stored information about a first entity and stored information about a second entity. The data repository may be a database or may have any other structure. In some examples, the stored information includes one or more of a first name, a last name, a telephone number, an email address, a postal address, a social networking link or handle, and the like. The server determines, based on the accessed stored information about the first entity and the accessed stored information about the second entity, a set of information items known about both the first entity and the second entity. The server computes, based on the set of information items, a probability or score that the first entity corresponds to the second entity by computing an expressiveness score corresponding to a value of a first information item and a value of a second information item from the set of information items. The server provides an output representing the computed probability or score. In some cases, if the computed probability or score exceeds a threshold probability (e.g., 80% or 95%) or a threshold score, the server determines that the first entity and the second entity represent a common individual or organization based on the computed probability or score exceeding the threshold probability or score. The server combines, within the data repository, the first entity and the second entity into a single entity in response to determining that the first entity and the second entity represent a common individual or organization.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-3 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 4:
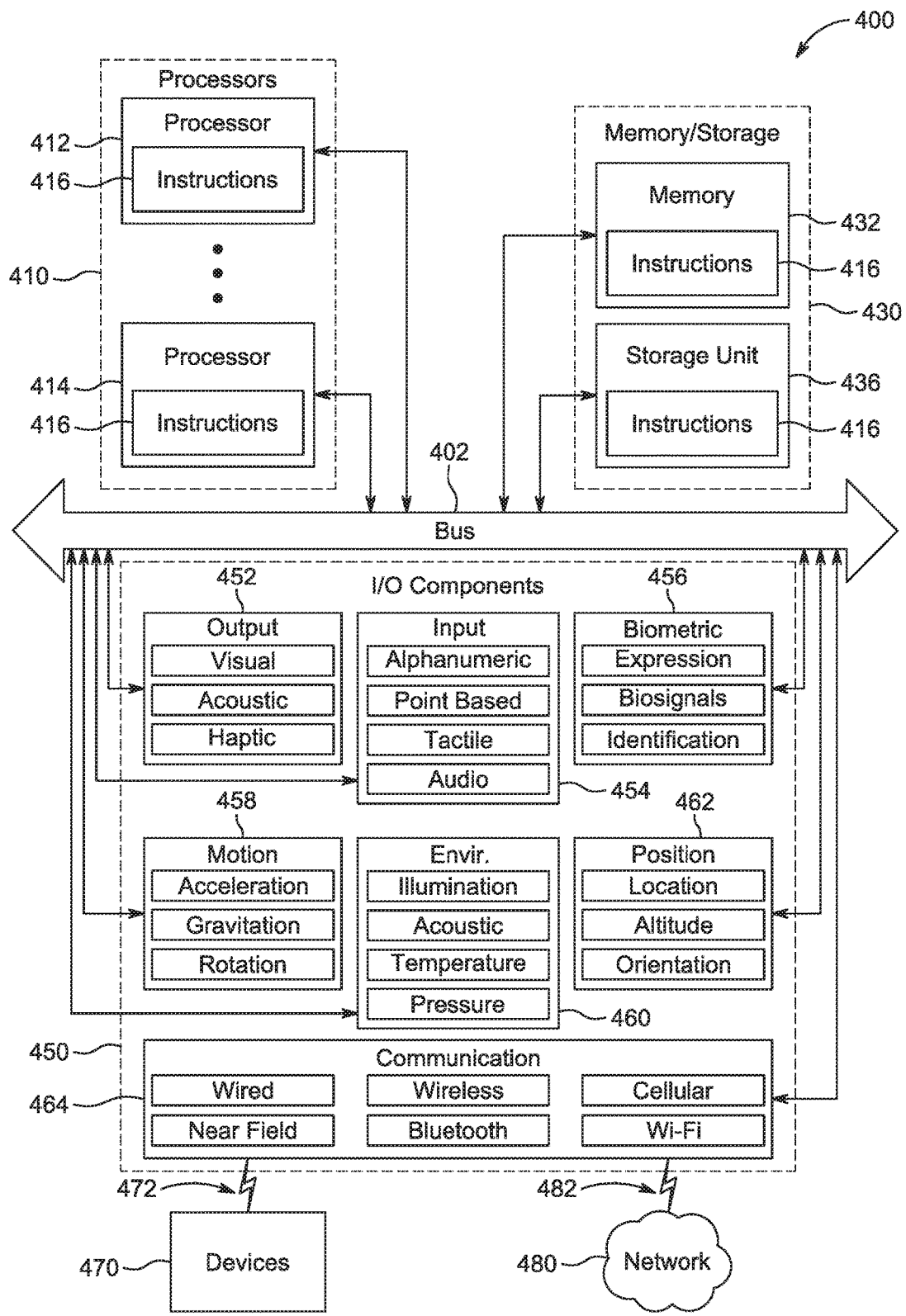
FIG. 4 is a block diagram illustrating components of a machine able to read instructions from a machine-readable medium and perform any of the methodologies discussed herein, in accordance with some embodiments.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. The instructions 416 transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory/storage 430, and I/O components 450, which may be configured to communicate with each other such as via a bus 402. In an example embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions contemporaneously. Although FIG. 4 shows multiple processors 410, the machine 400 may include a single processor with a single core, a single processor with multiple cores (e.g., a multi-core processor), multiple processors with a single core, multiple processors with multiples cores, or any combination thereof.

The memory/storage 430 may include a memory 432, such as a main memory, or other memory storage, and a storage unit 436, both accessible to the processors 410 such as via the bus 402. The storage unit 436 and memory 432 store the instructions 416 embodying any one or more of the methodologies or functions described herein. The instructions 416 may also reside, completely or partially, within the memory 432, within the storage unit 436, within at least one of the processors 410 (e.g., within the processor's cache memory), or any suitable combination thereof, during execution thereof by the machine 400. Accordingly, the memory 432, the storage unit 436, and the memory of the processors 410 are examples of machine-readable media.

As used herein, "machine-readable medium" means a device able to store instructions (e.g., instructions 416) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine (e.g., processors 410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various example embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or other suitable device to interface with the network 480. In further examples, the communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a USB).

Moreover, the communication components 464 may detect identifiers or include components operable to detect identifiers. For example, the communication components 464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The term "transmission medium" shall be taken to include any intangible medium that is capable of storing, encoding, or carrying the instructions 416 for execution by the machine 400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing stored information about a first entity and stored information about a second entity;
   determining, based on the accessed stored information about the first entity and the accessed stored information about the second entity, a set of information items known about both the first entity and the second entity, each information item having an information type;

computing, based on the set of information items, a probability that the first entity corresponds to the second entity by computing one or more expressiveness scores for a first information item for both the first entity and the second entity, and for a second information item for both the first entity and the second entity, wherein the first information item and the second information item are from the set of information items, and wherein at least one of the one or more expressiveness scores are computed based on, among other things, a probability that the first information item for the first entity and the second information item for the first entity correspond to a same individual within a population, wherein the at least one of the one or more expressiveness scores corresponds to increasing the probability that the first entity corresponds to the second entity if a combination of the first information item and the second information item is uncommon within the population, and wherein the at least one of the one or more expressiveness scores corresponds to decreasing the probability that the first entity corresponds to the second entity if the combination of the first information item and the second information item is common within the population; and providing, as a digital transmission, an output representing the computed probability.

2. The method of claim 1, wherein the first information item and the second information item have a different information type, and wherein the information type comprises one of a name type, a contact type, a business type, and a geography type.

3. The method of claim 1, wherein at least one of the one or more expressiveness scores measures a codependence between the first information item and the second information item, wherein the codependence indicates a likelihood that text from the first information item appears in the second information item.

4. The method of claim 1, further comprising:
determining that the computed probability exceeds a threshold probability; and
determining that the first entity and the second entity represent a common individual or organization based on the computed probability exceeding the threshold probability.

5. The method of claim 4, further comprising:
combining the first entity and the second entity into a single entity in response to determining that the first entity and the second entity represent the common individual or organization.

6. The method of claim 1, wherein the information about the first entity comprises one or more of a first name, a last name, a telephone number, an email address, and a postal address, and wherein the information about the second entity comprises one or more of a first name, a last name, a telephone number, an email address, and a postal address.

7. The method of claim 1, wherein the first entity represents an individual whom one or more users wish to contact, wherein the second entity represents an individual whom the one or more users have contacted previously, and wherein the output representing the computed probability comprises a notification that the one or more users have likely previously contacted the individual represented by the first entity.

8. A non-transitory machine-readable medium storing instructions which, when executed by one or more processors of a machine, cause the machine to:

access stored information about a first entity and stored information about a second entity;

determine, based on the accessed stored information about the first entity and the accessed stored information about the second entity, a set of information items known about both the first entity and the second entity, each information item having an information type;

compute, based on the set of information items, a probability that the first entity corresponds to the second entity by computing one or more expressiveness scores for a first information item for both the first entity and the second entity, and for a second information item for both the first entity and the second entity, wherein the first information item and the second information item are from the set of information items, and wherein at least one of the one or more expressiveness scores are computed based on, among other things, a probability that the first information item for the first entity and the second information item for the first entity correspond to a same individual within a population, wherein the at least one of the one or more expressiveness scores corresponds to increasing the probability that the first entity corresponds to the second entity if a combination of the first information item and the second information item is uncommon within the population, and wherein the at least one of the one or more expressiveness scores corresponds to decreasing the probability that the first entity corresponds to the second entity if the combination of the first information item and the second information item is common within the population; and provide, as a digital transmission, an output representing the computed probability.

9. The machine-readable medium of claim 8, wherein the first information item and the second information item have a different information type, and wherein the information type comprises one of a name type, a contact type, a business type, and a geography type.

10. The machine-readable medium of claim 8, wherein at least one of the one or more expressiveness scores measures a codependence between the first information item and the second information item, wherein the codependence indicates a likelihood that text from the first information item appears in the second information item.

11. The machine-readable medium of claim 8, further storing instructions which, when executed by the one or more processors of a machine, cause the machine to:
determine that the computed probability exceeds a threshold probability; and
determine that the first entity and the second entity represent a common individual or organization based on the computed probability exceeding the threshold probability.

12. The machine-readable medium of claim 11, further storing instructions which, when executed by the one or more processors of a machine, cause the machine to:
combine the first entity and the second entity into a single entity in response to determining that the first entity and the second entity represent the common individual or organization.

13. The machine-readable medium of claim 8, wherein the information about the first entity comprises one or more of a first name, a last name, a telephone number, an email address, and a postal address, and wherein the information about the second entity comprises one or more of a first name, a last name, a telephone number, an email address, and a postal address.

14. The machine-readable medium of claim 8, wherein the first entity represents an individual whom one or more users wish to contact, wherein the second entity represents an individual whom the one or more users have contacted previously, and wherein the output representing the computed probability comprises a notification that the one or more users have likely previously contacted the individual represented by the first entity.

15. A system comprising:
one or more processors of a machine; and
a memory storing instructions which, when executed by the one or more processors of the machine, cause the machine to:
   access stored information about a first entity and stored information about a second entity;
      determine, based on the accessed stored information about the first entity and the accessed stored information about the second entity, a set of information items known about both the first entity and the second entity, each information item having an information type;
      compute, based on the set of information items, a probability that the first entity corresponds to the second entity by computing one or more expressiveness scores for a first information item for both the first entity and the second entity, and for a second information item for both the first entity and the second entity, wherein the first information item and the second information item are from the set of information items, and wherein at least one of the one or more expressiveness scores are computed based on, among other things, a probability that the first information item for the first entity and the second information item for the first entity correspond to a same individual within a population, wherein the at least one of the one or more expressiveness scores corresponds to increasing the probability that the first entity corresponds to the second entity if a combination of the first information item and the second information item is uncommon within the population, and wherein the at least one of the one or more expressiveness scores corresponds to decreasing the probability that the first entity corresponds to the second entity if the combination of the first information item and the second information item is common within the population; and
   provide, as a digital transmission, an output representing the computed probability.

16. The system of claim 15, wherein the first information item and the second information item have a different information type, and wherein the information type comprises one of a name type, a contact type, a business type, and a geography type.

17. The system of claim 15, wherein at least one of the one or more expressiveness scores measures a codependence between the first information item and the second information item, wherein the codependence indicates a likelihood that text from the first information item appears in the second information item.

* * * * *